United States Patent [19]

Chang

[11] Patent Number: 5,062,650

[45] Date of Patent: Nov. 5, 1991

[54] MULTI-FUNCTION CHAIR

[76] Inventor: C. I. Chang, 157-1, Hou-Hu, ChiaYi City, Taiwan

[21] Appl. No.: 469,018

[22] Filed: Jan. 23, 1990

[51] Int. Cl.⁵ ............................................. A47C 13/00
[52] U.S. Cl. ..................................... 297/129; 280/30; 280/47.18
[58] Field of Search .................. 297/129, 118; 280/30, 280/47.18

[56] References Cited

U.S. PATENT DOCUMENTS

| | | | |
|---|---|---|---|
| 3,997,213 | 12/1976 | Smith et al. | 297/129 X |
| 4,290,625 | 9/1981 | Barriere | 297/129 X |
| 4,733,905 | 3/1988 | Buickerood et al. | 297/129 |
| 4,824,167 | 4/1989 | King | 280/30 X |

Primary Examiner—Peter R. Brown
Attorney, Agent, or Firm—Fleit, Jacobson, Cohn, Price, Holman & Stern

[57] ABSTRACT

A multi-function chair comprising a fore and a hind leg pivotally combined together and adapted to be altered to become a chair or a light duty truck or to be folded up to become a small dimension for storing away.

2 Claims, 4 Drawing Sheets

MULTI-FUNCTION CHAIR

BACKGROUND OF THE INVENTION

The dimensions of common chairs generally cannot be reduced when the chairs are not in use, nor can such chairs be used for other purposes.

SUMMARY OF THE INVENTION

The object of this invention is to provide a multi-function chair which may be folded to occupy a small dimension when not in use or to be altered to become a light duty truck.

This invention comprises a seat, a backrest, a fore leg, a hind leg and two extending tubes as the main parts.

The seat consists of two parallel tubes and a plurality of parallel crosswise plates fixed on and extending between the two tubes. The backrest is made up of a U-shaped tube frame and a plurality of parallel crosswise plates fixed on the frame.

The fore leg is a rectangular frame and the hind leg is a U-shaped frame, both legs pivotally combined together with a shaft tube passing through the longitudinal center of both, so that the legs are adapted to turn freely in relation to each other.

Two extending tubes are linked with the upper ends of the hind leg by two respective linking members and are contained within and can be moved back and forth in the two parallel tubes of the seat so that the fore and the hind leg can be moved. In use as a chair, the upper end of the fore leg engages two stop projections under the seat.

If the fore leg and the hind leg are folded up, this chair becomes a small dimension, convenient for storing away.

The chair of this invention may also be adapted to be used as a light duty truck. To convert the chair to such use, the lower end of the hind leg is pulled toward the lower end of the fore leg so that the hind leg is in a longitudinally straight line with the parallel tubes. The upper ends of hind leg are then inserted into the respective openings of the parallel tubes, whereby the hind leg upper ends, the linking members, and the extending tubes are hidden from view inside the parallel tubes. The fore leg is then secured from movement by means of two brackets.

BRIEF DESCRIPTION OF THE DRAWINGS

This invention will now be described in detail with reference to accompanying drawings wherein.

DETAILED DESCRIPTION OF THE INVENTION

Figure 1:
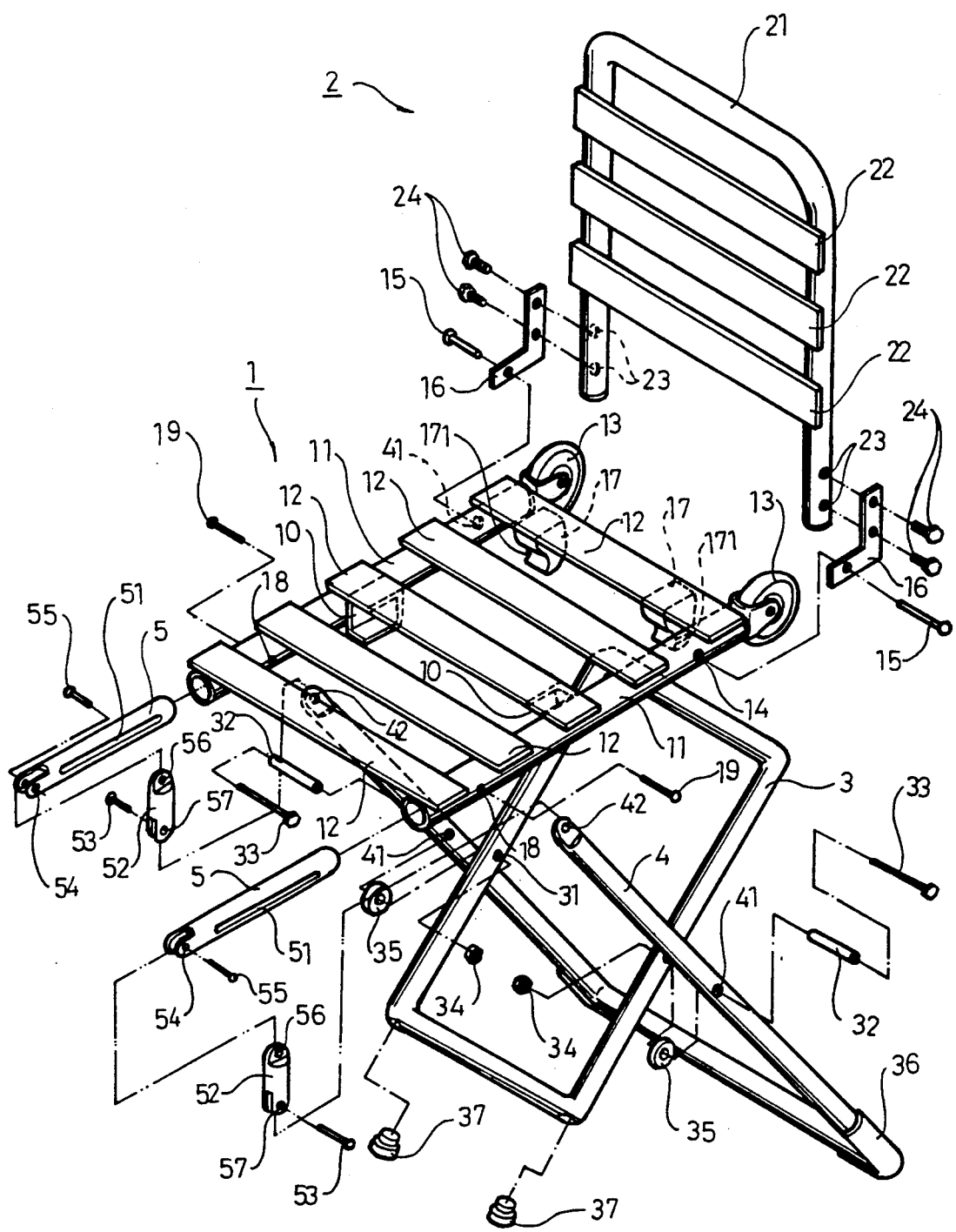
FIG. 1 is an exploded perspective view of the multi-function chair in accordance with the present invention.

Referring to FIG. 1, the multi-function chair according to the present invention comprises seat 1, backrest 2, fore leg 3, hind leg 4 and two extending tubes 5 as the main parts.

Seat 1 comprises two parallel tubes 11 and a plurality of parallel crosswise plates 12 mounted on and extending between tubes 11. The rear ends of tubes 11 are fixed with slide wheels 13 and have a pin hole 14 near wheels 13 for a pin 15 to fit in for combining L-shaped fasteners 16. Fasteners 16 have the horizontal sections pinned together with tubes 11 and the vertical sections bolted together with frame rod 21 of backrest 2. Stop projections 17 are fixed at the undersides of the rear ends of tubes 11, provided with a projection edge 171 for the two fore leg corners to hold when the invention is used as a chair for leg 3 in position. The front ends of tubes 11 contain holes in which are inserted the extending tubes 5 can move back and forth in tubes 11. Tubes 11 are provided with pin hole 18 for pin 19 to run through to limit moving distance of extending tubes 5 with pin 19 also running through straight slots 51 in tubes 5. Brackets 10 are provided at about the longitudinal centers of parallel tubes 11 to restrict movement of the fore leg 3 when this chair is altered into a light duty truck.

Backrest 2 comprises a U-shaped frame 21 and a plurality of parallel crosswise plates 22 mounted on frame 21. Frame 21 has two bolt holes 23 at both the lower sides for bolts 24 to screw in L-shaped fasteners 16 for combining backrest 2 with seat 1 firmly at a right angle.

Figure 5:
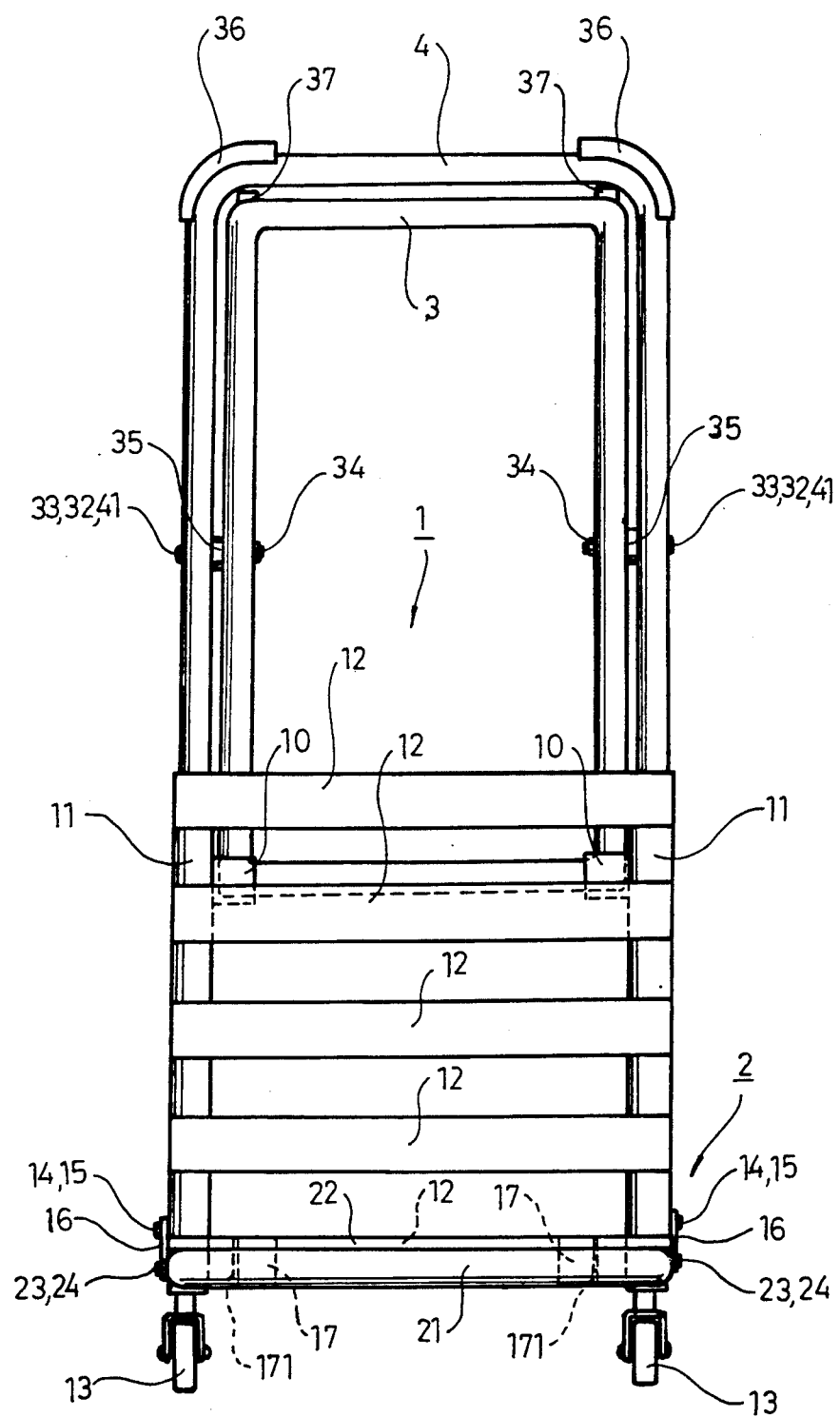
FIG. 5 is a front view of the multi-function chair altered into a light duty truck in the present invention.

Fore leg 3 is made of tubes and is rectangularly shaped, having its rear section engaging stop projections 17 when unfolded as a chair, but engaging with brackets 10 when altered as a truck as shown in FIG. 5. Fore leg 3 has shaft hole 31 at the longitudinal center for shaft tube 32 to pass through, and bolt 33 passes through shaft tube 32 to screw with nut 34 for securing fore leg 3 and hind leg together. In order to enable fore leg 3 to move pivotally in relation to hind leg 4, gasket 35 is placed between the both 3 and 4 inserted therethrough by shaft tube 32. The front section of fore leg 3 has two anti-sliders 37 at both corners to prevent fore leg 3 from sliding on the ground.

Hind leg 4 is U-shaped, having shaft hole 41 at the longitudinal center for shaft tube 32 to pass through for securing with fore leg 3 and pin hole 42 at both upper ends for pins 53 to insert for connecting with linking tubes 52 having pin holes 57 for pins 53 to insert. The bending corners of hind leg 4 are covered with anti-slide tubes 36 to prevent this chair from sliding on the ground and to keep the horizontal portion of hind leg 4 from becoming dirty by a gap between said portion and the ground.

Both extending tubes 5 have a straight slot 51 for pin 19 to pass through so that extending tubes are confined to move back and forth in parallel tubes 11, and pin holes 54 for pins 55 to pass through for combining with linking tubes 52 having pin holes 56 for pins 55 to insert too. Linking tubes 52 also have pin holes 57 for pins 53 to pass through for combining with hind leg 4.

Above-mentioned pins 19, 53 and 55 must be secured in position without falling off after combining the related parts, and must function as pivots enabling the related parts to move around smoothly.

Figure 2:
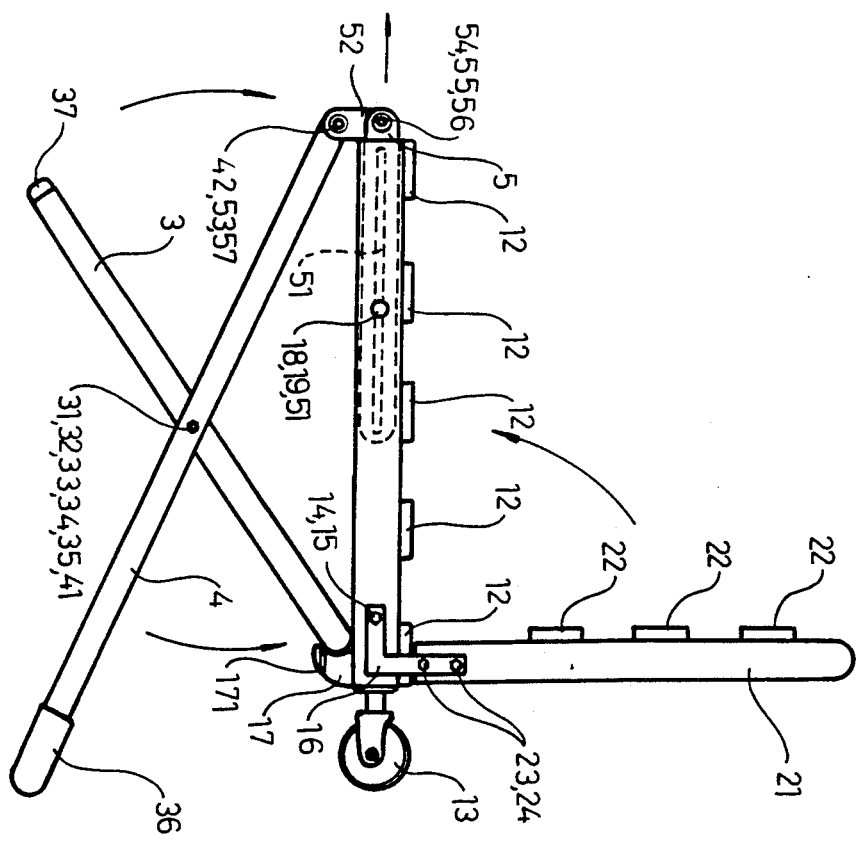
FIG. 2 is a side view of the multi-function chair in accordance with the present invention.

Referring to FIG. 2, it can be understood that the rear section of fore leg 3 engages with the stop projections 17 and the upper ends of hind leg 4 link with linking tubes 52 so that this chair has strength enough to support a person's weight.

Figure 3:
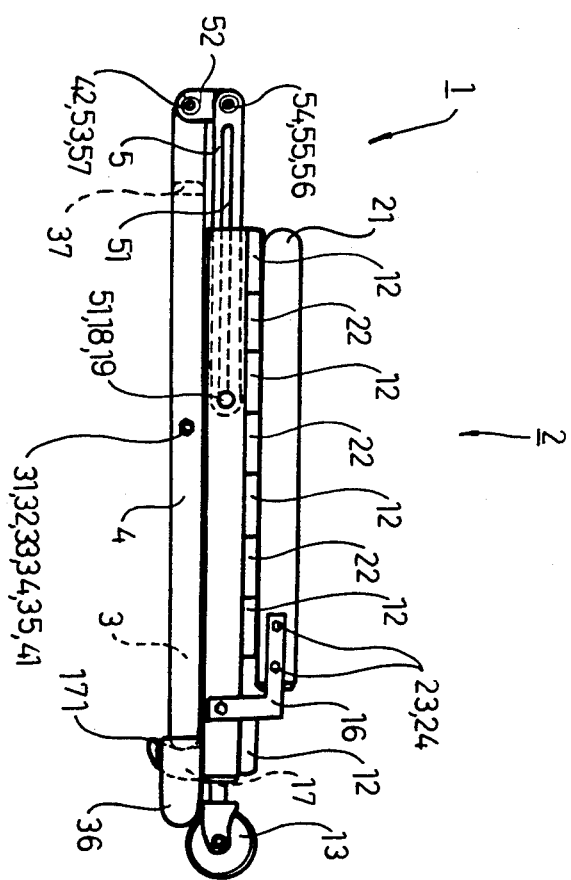
FIG. 3 is a side view of the multi-function chair after folded up in accordance with the present invention.

FIG. 3 shows this chair being folded for easier storage. When extending tubes 5 are pulled out of the outer end of parallel tubes 11, fore leg 3 and hind leg 41 kept cross to each other are folded to rest under seat 1. Backrest 2 is also pushed downward to rest on seat 1, which forms a compact dimension handy for storing away.

Figure 4:
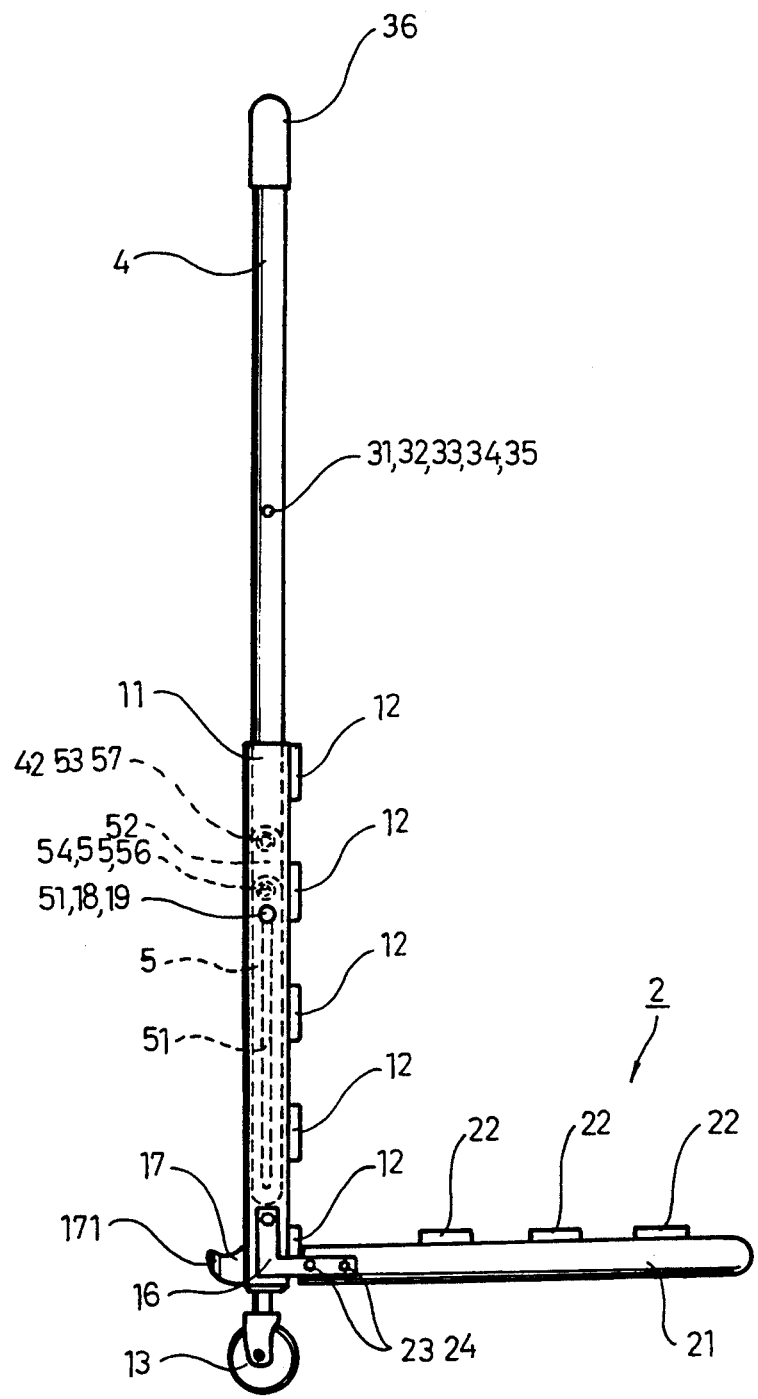
FIG. 4 is a side view of the multi-function chair altered into a light duty truck in the present invention.

The chair of this invention may also be adapted to be used as a light duty truck, as is shown in FIG. 4. To convert the chair to such use, the lower end of the hind leg 4 is pulled toward the lower end of the fore leg 3 so that the hind leg 3 is in a longitudinally straight line with the parallel tubes 11. The upper ends of the hind leg 4 are then inserted into the respective openings of the parallel tubes 11, whereby the hind leg 4 upper ends, the linking members 52, and the extending tubes 5 are hidden from view inside the parallel tubes 11. The fore leg 3 is then secured from movement by means of the two brackets 10, as shown in FIG. 5. The remaining exposed section of the hind leg 4 serves as the pulling handle.

What is claimed is:

1. A multi-function chair structure, comprising:
   a seat comprising of two parallel round tubes and a plurality of parallel crosswise plates fixed on and extending between the parallel tubes, each tube having an open front end, a first pair of opposing pin holes at a rear end of said tube, a second pair of opposing pin holes adjacent the front end of the tube, a wheel on the rear end of each tube mounted on an axis perpendicular to the tube and a stop projection fixed under the seat at the rear end of said tube, and a bracket at approximately the longitudinal center of said tube;
   a backrest comprising a U-shaped tube frame and a plurality of parallel crosswise plates fixed on the frame, each leg of said U-shaped frame having a third pair of opposing pin holes at lower ends of the limbs of said frames to attach said frame, by means of bolts through said third pin holes, to one leg of an L-shaped fastener, another leg of said fastener being attached to a corresponding said parallel tube by means of bolts though said tube's first pair of pin holes, whereby the seat is connected to the backrest;
   a fore leg shaped as a rectangular frame, having a first shaft hole at approximately the longitudinal center of each of two side tubes of said fore leg;
   a U-shaped hind leg, having a second shaft hole at approximately the longitudinal center of each of two side limbs of said hind leg so that a shaft tube may pass through both the first shaft holes of said fore leg and said second shaft holes of said hind leg, to affix the fore leg with the hind leg;
   two extending tubes received respectively in the front ends of said round tubes, each extending tube having a straight slot for a pin received in said second opposing pin holes of a corresponding said parallel tube to pass through, and each having a fourth pair of opposing pin holes at a front end of said extending tube for a pin to connect with a linking member, said linking member attached on an opposite end to a corresponding free end of a limb of said hind leg, whereby said extending tubes are mounted for back and forth motion within said parallel tubes, to enable partial ingress into and egress out of the front end of each of said parallel tubes for the respective linking members and limbs of the hind leg, the legs being moveable between a first configuration for use of the structure as a chair in which the linking members are withdrawn from the front ends of said parallel tubes, the hind leg limbs and fore leg side tubes are angled relative to one another under the seat and a top tube of the fore leg engages said stop projection, and a second configuration for use of the structure as a truck supported on said wheels in which the linking members are inserted in the front ends of said parallel tubes, the limbs of the hind leg project coaxially from the front ends of said parallel tubes and the top tube of the fore leg engages said brackets with the fore leg side tubes being parallel to the hind leg limbs.

2. A multi function chair structure comprising:
   a seat comprising two parallel tubes, each having stop projection at a rear end of said tubes;
   a U-shaped backrest having two limbs, each limb attached to a corresponding parallel tube of said seat;
   a pair of wheels projecting from the seat behind the backrest;
   connecting means, for connecting said parallel tubes together and for connecting said limbs of said backrest together;
   a rectangularly-shaped fore leg;
   a U-shaped hind leg pivotally attached to said fore leg at approximately the longitudinal centers of both said legs;
   movable extending tubes contained within a front portion of said parallel tubes remote from the backrest, the movement of said extending tubes constrained to back and forth motion within said parallel tubes;
   linking members to connect said extending tubes to corresponding ends of said hind leg, movement of the extending tubes enabling the linking members to be extended from and withdrawn into the front portions of the parallel tubes, the legs being movable between a first configuration for use of the structure as a chair wherein the linking members are extended from the parallel tubes, the legs are relatively angled under the seat and a top end of the fore leg engages aid stop projections, and a second configuration for use of the structure as a truck supported on said wheels wherein the linking members are withdrawn into the parallel tubes, opposite limbs of the hind leg extend coaxially from said parallel tubes and side limbs of the fore leg extend parallel to said opposite limbs of the hind leg.

* * * * *